United States Patent
Hong et al.

(10) Patent No.: US 9,251,605 B2
(45) Date of Patent: Feb. 2, 2016

(54) RESIDUAL ACTIVITY CORRECTION AT RECONSTRUCTION

(71) Applicants: Inki Hong, Knoxville, TN (US); Xiao-Bo Pan, Oxford (GB)

(72) Inventors: Inki Hong, Knoxville, TN (US); Xiao-Bo Pan, Oxford (GB)

(73) Assignee: Siemens Medical Solutions USA, Inc., Malvern, PA (US)

(*) Notice: Subject to any disclaimer, the term of this patent is extended or adjusted under 35 U.S.C. 154(b) by 61 days.

(21) Appl. No.: 14/178,673

(22) Filed: Feb. 12, 2014

(65) Prior Publication Data
US 2014/0226883 A1    Aug. 14, 2014

(30) Foreign Application Priority Data
Feb. 12, 2013 (GB) .................................. 1302409.6

(51) Int. Cl.
*G06K 9/00* (2006.01)
*G06T 11/00* (2006.01)

(52) U.S. Cl.
CPC ..... *G06T 11/005* (2013.01); *G06T 2207/10104* (2013.01); *G06T 2207/10108* (2013.01); *G06T 2211/424* (2013.01)

(58) Field of Classification Search
None
See application file for complete search history.

(56) References Cited

U.S. PATENT DOCUMENTS

| | | | | |
|---|---|---|---|---|
| 5,489,782 | A * | 2/1996 | Wernikoff | 250/369 |
| 6,066,858 | A * | 5/2000 | Kawasaki et al. | 250/583 |
| 7,848,557 | B2 * | 12/2010 | Kadrmas et al. | 382/131 |
| 2003/0103595 | A1 | 6/2003 | Raupach | |
| 2006/0108509 | A1 * | 5/2006 | Frangioni et al. | 250/208.1 |
| 2007/0217566 | A1 | 9/2007 | Chen et al. | |
| 2008/0230703 | A1 * | 9/2008 | Kadrmas et al. | 250/363.03 |
| 2013/0334429 | A1 * | 12/2013 | Fukuchi et al. | 250/363.03 |
| 2013/0336564 | A1 * | 12/2013 | Hu et al. | 382/131 |
| 2014/0121511 | A1 * | 5/2014 | Kadrmas et al. | 600/431 |
| 2014/0175293 | A1 * | 6/2014 | Fukuchi et al. | 250/362 |
| 2014/0226883 | A1 * | 8/2014 | Hong et al. | 382/130 |
| 2014/0233822 | A1 * | 8/2014 | Kaftan et al. | 382/131 |
| 2015/0066436 | A1 * | 3/2015 | Elliott et al. | 702/189 |

OTHER PUBLICATIONS

Xiao-Bo Pan et al. Instrumentation & Data Analysis: Data Analysis & Management, Data Analysis and Management Posters Residual activity correction for computing myocardial blood flow from dynamic 13NH3 studies, (2011).
Evaluation of the Novel Myocardial Perfusion Positron-Emission, Tomography Tracer 18F-BMS-747158-02: Comparison to 13N-Ammonia and Validation With Microspheres in a Pig Model, Circulation,( 2009) 119: pp. 2333-2342.

* cited by examiner

*Primary Examiner* — Aaron W Carter
(74) *Attorney, Agent, or Firm* — Schiff Hardin LLP

(57) ABSTRACT

In a method for correcting for residual activity due to an earlier tracer in a later PET or SPECT scan image at reconstruction, thereby generating a residual-corrected later image the residual activity is estimated by detecting the time of an introduction of a tracer for the later PET or SPECT scan; and separating the residual activity from the true counts during iterative reconstruction of the PET or SPECT scan image.

10 Claims, 2 Drawing Sheets

RESIDUAL ACTIVITY CORRECTION AT RECONSTRUCTION

BACKGROUND OF THE INVENTION

1. Field of the Invention

The present invention concerns the reconstruction of images of a subject using raw data acquired from a positron emission tomography (PET) scan or a single-photon emission computed tomography (SPECT) scan.

2. Description of the Prior Art

Medical or veterinary imaging, for example cardiac imaging, often requires a set of scans to be acquired in rapid succession, for example showing rest and stress states for myocardial perfusion studies.

In methods such as PET or SPECT scan imaging, muscular tissue such as the heart it not itself directly imaged. Rather, a tracer is introduced into a patient's bloodstream, and the imaging process provides images of the location of the tracer. The imaging effect of the tracer diminishes with time, at a rate which is characterized by a half-life. Depending on the half-life of the tracer, second and consecutive scans could detect remaining residual activity from previous doses of tracer, which would affect the contrast and image quality and bias the quantification assessment of the scan.

To overcome this problem, consecutive scans are often acquired with delays in between, e.g. half an hour or more for $^{13}NH_3$ scan, or respective scans are performed on different days such as for $^{99m}Tc$ SPECT imaging. This means longer waiting time for the patients and reduced scanner throughput.

Another known way to reduce the effect of tracer residual from earlier scans is to use a low dose for a first scan and a much higher dose for a second scan, for example with a dose ratio of 1:5. The residual activity of the first tracer in the second scan, for example about half an hour later, is low compared with the high injected dose; therefore the bias of image quality is kept to certain controllable degree. This is proposed for $^{18}$Flurpiridaz scans which use the radionuclide $^{18}F$ and has a half-life of 110 minutes. This half-life is too long for implementing a delayed scan protocol for same day scanning. However, as this method involves much higher dose for the second scan, the image quality is different for the first and second scans due to dose difference, and the bias introduced by the residual activity potentially reduces the accuracy of the assessment.

Existing methods of removing the deleterious effects of residual tracer activity are often based on subtraction of reconstructed images. An example of such a conventional process will be discussed with reference to example images shown in FIGS. 1A-1C, which each show three views of a single PET image.

An early frame image is shown in FIG. 1A, as acquired before the tracer is injected for a further scan, so that it contains only the residual activity from a previous scan.

FIG. 1B shows corresponding late frame images, taken after a further tracer has been introduced.

The early frame image of FIG. 1A is subtracted from the late frame image acquired after tracer injection as in FIG. 1B. An example result image is shown in FIG. 1C, which is intended to represent the later frame image of FIG. 1B with the residual effects of the earlier tracer removed.

A problem with such subtraction method is that image noise is effectively amplified, potentially leaving large negative values which are shown as dark speckles in the subtracted image. Examples of such speckles may be seen in FIG. 1C. Sometimes other image artefacts could be introduced, due to motion or noise.

Another conventional residual activity correction method based on time activity curves (TAC) where the tracer uptakes over time (referred as TAC) in ROIs are derived. The first time point of a TAC represents the residual activity, and is subtracted from all the time points of the TAC. The corrected TACs are then used in the kinetic model fitting for the quantification of physiological effects. This method does not produce a residual corrected anatomical image such as FIG. 1C for visualization.

Such methods are described, for example, in X-B Pan, E Alexanderson, L Le Meunier, J Declerck, *Residual activity correction for computing myocardial blood flow from dynamic* 13$NH$3 *studies,* J. NUCL. Med. MEETING ABSTRACTS, May 2011; 52: 2103 and S. G. Nekolla; S. Reder; A. Saraste; T. Higuchi; G. Dzewas; A. Preissel; M. Huisman; T. Poethko; T. Schuster; M. Yu; S. Robinson; D. Casebier; J. Henke; H. J. Wester; M. Schwaiger, *Evaluation of the Novel Myocardial Perfusion Positron-Emission Tomography Tracer* 18$F$-BMS-747158-02: *Comparison to* 13$N$-*Ammonia and Validation With Microspheres in a Pig Model,* Circulation, 2009; 119: 2333-2342.

Assumptions made in these methods include:

listmode acquisition starts a short period, such as 10 seconds, before the later introduction of tracer.

uptake of the residual activity has reached equilibrium, and can be modelled by radioactive decay only.

SUMMARY OF THE INVENTION

The above object is achieved in accordance with the present invention by a method of correcting residual activity due to the presence of an earlier tracer in a later PET or SPECT scan image during reconstruction from the PET or SPECT raw data, in order to generate a residual-corrected later image. In accordance with the invention, the residual activity of the earlier-introduced tracer is estimated by detecting the time of introduction of the tracer for the later (current) PET or SPECT scan. The estimated residual activity is then separated from the true counts of the current scan during iterative reconstruction of the PET or SPECT scan image.

DESCRIPTION OF THE PREFERRED EMBODIMENTS

The present invention provides methods for improving images obtained in consecutive scans such as PET or SPECT scans, in which residual effects from earlier scans may be observed. According to the present invention, this is achieved by estimating the residual activity and removing it during image reconstruction so that the reconstructed dynamic or static images are free of the residual activity. The results compare favorably to conventional methods in which early frame images and late frame images are each reconstructed, and then subtracted. The effective amplification of noise, discussed above, is also avoided by the present invention.

The method of the present invention enables a shortened waiting time between scans and an improved scanner throughput by allowing effective interpretation of images taken at reduced time intervals.

The present invention estimates and removes the residual activity using list mode data and PET or SPECT sinogram at the image reconstruction stage in a processor.

In an example embodiment, a method of the present invention may proceed as follows.

From a count-rate curve over time, also known as head curve, of the listmode data, the time of the tracer injection is automatically detected by detecting a sudden rise of the counts. This can be done, for example, by a conventional derivative threshold method, or other known processing techniques such as phase. For the phase method, the head curve is decomposed into structure and contrast information, and the time of tracer injection is detected by identifying the 'up-step' from the structure information. Alternative methods may be used for detecting the time of the tracer injection, for example by monitoring a count rate in one or more selected small regions in the image.

Figure 1A:
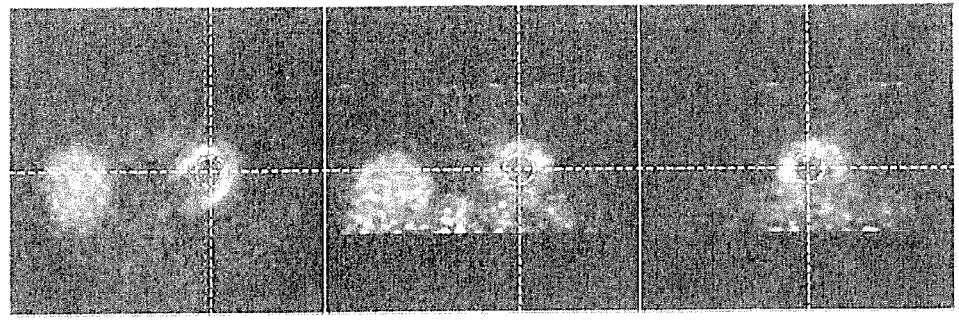
FIGS. 1A-1C illustrate a conventional method for removing the effect of residual tracer from an earlier PET scan on a later PET scan image.
Figure 1B:
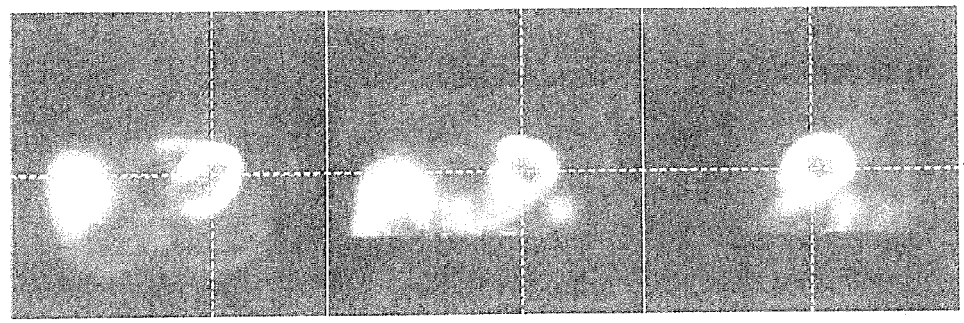
Figure 1C:
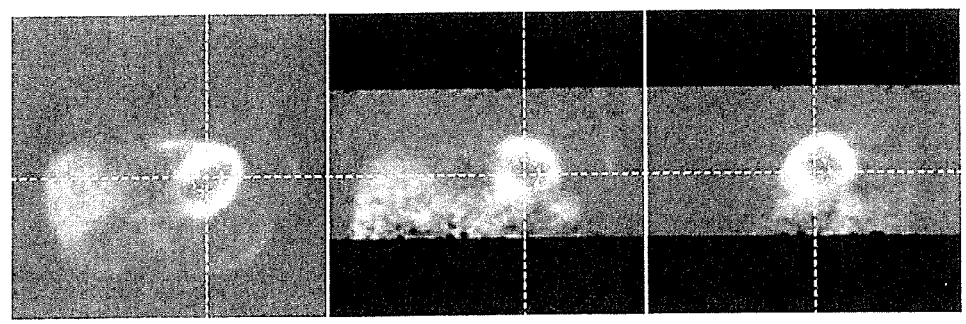
Figure 2:
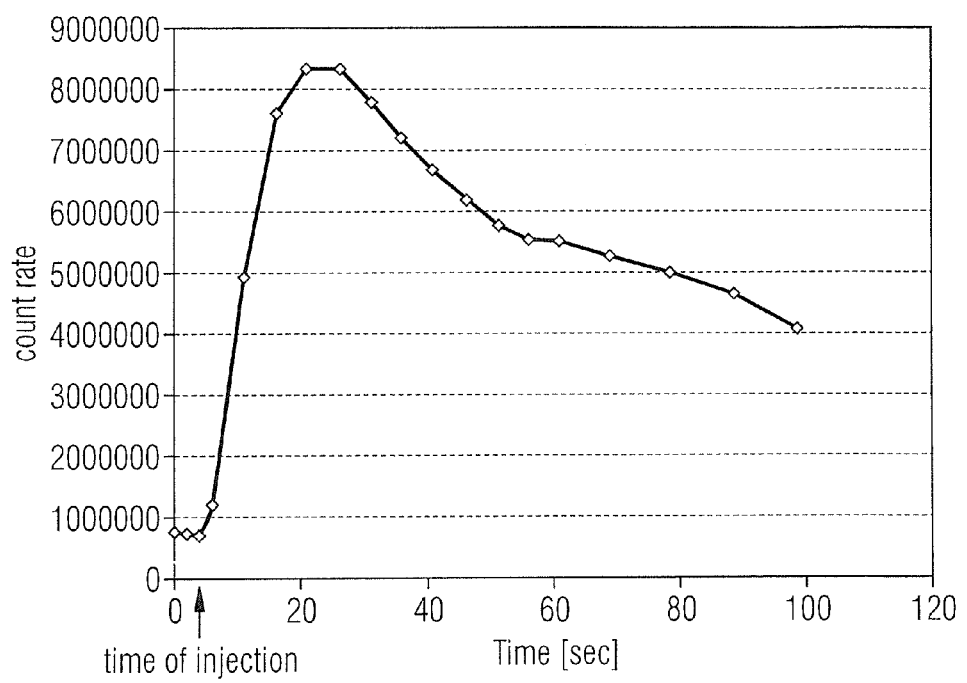
FIG. 2 illustrates an example time-variation of count rate following introduction of a PET tracer.

FIG. 2 illustrates an example head curve from the listmode data, which shows time-variation of count rate following introduction of a PET tracer. By observing variation in count rate over time and comparing it to a reference curve for the appropriate tracer, the time of injection of the tracer can be calculated. The turning point of the sharp rise is the time of injection. Prior to the time of injection the listmode data contains counts from the residual activity only.

The listmode data acquired prior to the time of tracer injection are binned and reconstructed into a residual activity only frame R(0). A residual only sinogram R_S(0) is generated from R(0) by forward projection. Other sinograms obtained from data acquired after the tracer injection are binned according to user specification as dynamic or static frames.

The residual activity in each frame R_S(m) is modelled by the residual sinogram R_S(0) with considering of the radioactive decay and is incorporated in the reconstruction using OSEM (Ordered Subset Expectation Maximization) or MLEM (Maximum Likelihood Expectation Maximization):

$$R\_S(m) = R\_S(0) \times 2^{-T(m)/\lambda}, m = 0, \ldots M$$

$$I_m(i+1) = I_m(i) \times \frac{1}{\text{Back\_projection}\left(\frac{1}{ACF \times Norm}\right)} \times$$

$$\text{Back\_projection}\left(\frac{S(m)}{\text{Forward\_projection}(I_m(i)) + (\text{Scatter} + \text{Random} \times Norm) \times ACF + R\_S(m)}\right)$$

where m is the frame number, R_S(m) is the residual activity in each dynamic sinogram frame, $\lambda$ is the tracer half-life, i is the number of iterations, S(m) is the sinogram of frame m, $I_m$ is the image frame. ACF represents an attenuation correction factor; Norm represents a normalization factor. Scatter, Random are estimated based on S(m).

"Scatter" and "Random" represent parts of the total counts which are regarded as noise. These should be removed or separated from counts representing the true image. ACF and Norm are corrections of the detector's non-linear behavior applied for the absolute quantification of the image. "Back_projection" and "Forward_projection" are transformations between different data space—for example between image space and sinogram space—derived according to scanner models and used in the image reconstruction.

The above equation is believed to represent a standard iterative image reconstruction method, with the modification of a second "Back_projection" term that incorporates the estimation of residual activity R_S(m) in the projection space, which in the present case may be sinogram space.

According to this aspect of the invention, a method for iterative reconstruction of a PET or SPECT image is provided, in which an estimated contribution of the residual activity from a previous scan is added, in projection space, to a forward-projected current estimate of the image. Further contributions from randoms, scatter, normalization and attenuation are also estimated and dealt with in a manner conventional in itself.

As shown in the above equation, the residual activity is separated from the true counts at each frame; the reconstructed image is therefore relatively free of the residual activity.

If motion is involved between the residual-only frame and later frames after tracer injection, a motion-correction step is required to realign the first residual frame to each of the late frames by registering R(0) to an uncorrected frame $I_m$ prior to binning and reconstruction of the listmode data.

The present invention accordingly provides a method of correcting for residual activity due to an earlier tracer from a later PET or SPECT image at reconstruction, thereby generating a residual-corrected image—an image with reduced residual content—the method comprising the steps of:

estimating the residual activity from first frame by detecting the time of injection from count-rate curve of listmode data;

representing the residual activity in a sinogram; and separating the residual activity from the true counts during iterative reconstruction of the scan image.

The invention has been described with reference to cardiac images, but may be applied to any medical or veterinary PET or SPECT image modality.

The methods of the present invention generate an image which has the residual activity removed, or at least reduced, and does not have the artefacts and amplified noises conventionally found when using a simple image subtraction method to reduce residual activity.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for reconstructing a medical image of a subject, comprising:

providing current scan data, selected from the group consisting of PET (Positron Emission Tomography) scan data and SPECT (Single-Photon Emission Computed Tomography) scan data, to a processor, said current scan data resulting from a current scan introduction of a tracer into the subject, said subject also having a tracer introduced into the subject prior to said current scan introduction, and the previously-introduced tracer producing residual activity in said current scan data;

in said processor, automatically detecting, from said current scan data, a time of said current scan introduction;

in said processor, automatically estimating said residual activity dependent on the detected time of said current scan introduction;

in said processor, executing an iterative reconstruction algorithm to reconstruct an image of the subject from said current scan data and, in the iterative execution of said reconstruction algorithm, separating said residual activity in said current scan data from non-residual activity in said current scan data to thereby correct the reconstructed image of the subject from contributions made by said residual activity; and making the reconstructed image available in electronic form at an output of said processor.

2. A method according to claim 1 wherein the step of estimating the residual activity comprises:

representing the residual activity in a sinogram.

3. A method according to claim 2 wherein the step of representing the residual activity in a sinogram comprises:

identifying listmode data acquired prior to the time of tracer injection and reconstructing that data into a residual activity only frame; and generating a residual only sinogram from the residual activity only frame by forward projection.

4. A method according to claim 3 comprising in said iterative reconstruction algorithm, adding an estimated contribution of residual activity from a previous scan, in projection space, to the forward projected current estimate of the image.

5. A method according to claim 4 comprising installing the residual activity in each frame by the residual only sinogram.

6. A method according to claim 1, wherein the step of detecting the time of said current scan introduction of said tracer with reference to a count-rate curve of listmode data over time.

7. A method according to claim 1 comprising detecting the time of said current scan introduction of said tracer by a derivative threshold method.

8. A method according to claim 7 comprising detecting the time of said current scan introduction of said tracer by a phase method, in which a count-rate curve over time is decomposed into structure and contrast information, and the time of said current scan introduction of said tracer is detected by identifying a step-up in the structure information.

9. A method according to claim 1 comprising separating the residual activity from the non-residual activity in the iterative reconstruction algorithm comprises:

obtaining sinograms from data acquired after the tracer introduction; and binning said sinograms as dynamic or static frames according to a designation entered into said processor.

10. A method according to claim 1, further comprising aligning the estimated residual activity to the reconstructed image to compensate for patient motion.

* * * * *